United States Patent [19]
Markle et al.

[11] Patent Number: 5,739,869
[45] Date of Patent: Apr. 14, 1998

[54] ELECTRONIC LIBRETTO DISPLAY APPARATUS AND METHOD

[75] Inventors: Patrick G. Markle, Santa Fe, N. Mex.; Geoffrey J.H. Webb, New York; Ronald E. Erkman, Staten Island, both of N.Y.

[73] Assignee: Figaro, Inc., Santa Fe, N. Mex.

[21] Appl. No.: 502,108

[22] Filed: Jul. 13, 1995

Related U.S. Application Data

[63] Continuation-in-part of Ser. No. 120,004, Sep. 10, 1993, abandoned.

[51] Int. Cl.$^6$ ........................................ H04N 1/02
[52] U.S. Cl. ........................... 348/589; 348/6; 348/8; 348/388
[58] Field of Search ............................ 348/6–8, 10, 12, 348/13, 388, 389, 461, 467, 468, 563, 564, 589, 600; 395/501

[56] References Cited

U.S. PATENT DOCUMENTS

| | | | |
|---|---|---|---|
| 4,389,679 | 6/1983 | Missan et al. | 360/12 |
| 4,516,156 | 5/1985 | Fabris et al. | 358/85 |
| 4,763,291 | 8/1988 | Schwaber | 364/704 |
| 4,820,167 | 4/1989 | Nobles et al. | 434/336 |
| 4,859,994 | 8/1989 | Zola et al. | 340/705 |
| 4,905,094 | 2/1990 | Pocock et al. | 358/342 |
| 4,959,828 | 9/1990 | Austin | 370/4 |
| 4,991,121 | 2/1991 | Minoura et al. | 364/521 |
| 5,075,850 | 12/1991 | Asahioka et al. | 364/419 |
| 5,109,482 | 4/1992 | Bohrman | 395/154 |
| 5,157,606 | 10/1992 | Nagashima | 364/419 |
| 5,241,657 | 8/1993 | Fine et al. | 395/162 |
| 5,313,408 | 5/1994 | Goto | 364/514 |
| 5,367,618 | 11/1994 | Ishida | 395/145 |
| 5,375,164 | 12/1994 | Jennings | 379/88 |
| 5,418,559 | 5/1995 | Blahut | 348/10 |
| 5,421,031 | 5/1995 | De Bey | 348/7 |
| 5,442,389 | 8/1995 | Blahut et al. | 348/7 |
| 5,493,339 | 2/1996 | Birch et al. | 348/461 |
| 5,497,241 | 3/1996 | Ostrover et al. | 386/97 |
| 5,557,724 | 9/1996 | Sampat et al. | 348/7 |

FOREIGN PATENT DOCUMENTS

| | | | |
|---|---|---|---|
| 0076237A1 | 4/1983 | European Pat. Off. | G03B 31/00 |
| 0132234A3 | 8/1985 | European Pat. Off. | G03B 21/26 |
| 0273138A1 | 10/1987 | European Pat. Off. | H04N 7/087 |
| 0263253A2 | 4/1988 | European Pat. Off. | H04M 1/00 |
| 2603389A1 | 3/1988 | France | A63J 5/10 |
| 2632467A1 | 12/1989 | France | A63J 5/10 |
| 92051227 | 4/1992 | Germany | G03B 23/00 |
| 2197103 | 9/1987 | United Kingdom | |
| WO91/06158 | 5/1991 | WIPO | H04H 1/00 |

OTHER PUBLICATIONS

Freeman, Roger L., Telecommunication transmission handbook, John Wiley & Sons, Inc. 1991.

Kreager, Paul S., Practical aspect of data communication, McGraw–Hill, Inc. 1983.

News Article, "Met Opera Ends Its Holdout on Performance Supertitles," New York Times, Aug. 20, 1993.

Editorial, "Apres Supertitles, Le Deluge?" New York Times, Classical View by Allan Kozinn, Aug., 1993.

New Article, "Eyes of Met Board Find New Titling Highly Readable," New York Times, Feb. 7, 1994.

*Primary Examiner*—Raymond J. Bayerl
*Assistant Examiner*—U. Chauhan
*Attorney, Agent, or Firm*—Dennis F. Armijo

[57] ABSTRACT

An apparatus and method for the simultaneous presentation of a performance script available in the original language or multiple translations, which can be selected by the user. In addition, other visual information such as scores and advertisements can be transmitted to each display.

18 Claims, 8 Drawing Sheets

ELECTRONIC LIBRETTO DISPLAY APPARATUS AND METHOD

CROSS-REFERENCE TO RELATED APPLICATIONS

This application is a continuation-in-part application of U.S. patent application Ser. No. 08/120,004, entitled "Electronic Libretto Display Apparatus and Method", to Figaro Systems, Inc., filed on Sep. 10, 1993, now abandoned. The teachings of which are incorporated herein by reference.

BACKGROUND OF THE INVENTION

1. Field of the Invention (Technical Field)

The invention relates to communication systems, and more particularly to a communication apparatus and method for simultaneous broadcasting of information by visual means of performances both live and recorded on several channels, whereby each channel can contain text in a language as selected by the user.

2. Background Art

The current state of the art for displaying translations of a performance, either live (as in theater or opera) or recorded (as in cinema or television mediums), is by displaying a single libretto upon a surface within the field of vision of the audience. The "super-titles" used in opera are usually in the language commonly spoken at the site of the performance. Translations in film and television is accomplished using "subtitles" which are superimposed over the presented image, different copies being made for specific languages.

The main problem with the current state of the art and specifically these systems is that the entire audience is forced to see the translation whether they want to or not. Only one translation at a time is feasible and the displayed information can become very large and too complicated to comprehend with the needed rapidity. Many opera patrons are offended by super-titles, whereas many other opera patrons find supertitles essential to their understanding and enjoyment of the performance.

It is, therefore, desirable to provide patrons with an individual or group display unit which can present a channel of information to view but does not obstruct the view or disturb patrons who do not wish to see the displayed information or other visual depictions of the performance.

U.S. Pat. No. 4,763,291 to Schwaber, entitled *Remote Display for a Microcomputer*, is set up specifically for displaying numeric data only. Further, Schwaber specifies a wireless distribution system. No mention is made of performances, or one or several multiple channels of information.

U.S. Pat. No. 4,820,167 to Nobles, et al., entitled *Electronic School Teaching System*, describes a method for transferring data between multiple teacher and student computers. The data is being sent in both directions (in both broadcast and individual address form) whereas the present invention is broadcast only. While written data is transmitted, it is designed for teaching purposes only. Additionally, there is no disclosure relating to transmission of multiple channels of information.

U.S. Pat. No. 4,516,156 to Fabris, et al., entitled *Teleconferencing Method and System*, describes a very complex system for the transmission of audio and visual signals in both directions between multiple sites. No mention is made of the transmission of written data. No mention is made of broadcasting from one source to many receivers or of written translations.

U.S. Pat. No. 5,075,850 to Asahioqa, et al., is a translations communication system for translating in real time one language to another. This device takes an input from a keyboard, tries to find a match in a second language or the inputted word in its memory and then transmits the translated word to the user.

U.S. Pat. No. 4,905,094 to Pocock, et al., discloses a method for the synchronization of audio to video signals.

Kreger, "Practical Aspects of Data Communications", McGraw Hill, Inc., 1983, and Freeman, "Telecommunication Transmission Handbook", John Wiley & Sons, Inc., 1991, describe well known network topologies.

French Patent No. 2 603 398 to Gatbois and Mourey, describes a libretto display system, however, to store and transmit different channels of information, additional storage and transmission devices are needed for each additional channel. In addition, the displaying of the text from different channels is not simultaneous, but sequential.

French Patent No. 2 632 467 to Morelock and Thompson, discloses a libretto display system with data stored on individual synchronized tape machines, each containing different languages. They are physically stopped to allow the performance to catch up to the text. No means exists for advancing or skipping text, for changing or editing text, or for accurate and timely presentation of the text on displays.

While all of these inventions transmit data by electronic means to one or more remote receivers, none are designed to display text or graphics in one of several channels of information at each of many remote receivers (displays) simultaneously.

SUMMARY OF THE INVENTION (DISCLOSURE OF THE INVENTION)

In accordance with the present invention there is provided an apparatus and method for providing individual users or groups the ability to select a visual text in a language for performances such as operas. The preferred multichannel apparatus for storing, transmitting and simultaneously displaying of at least one selected channel at a remote site comprises a main control unit for storing a preselected sequence of text, wherein the preselected sequence of text comprises the at least one channel and an apparatus for converting at least one predetermined portion of the preselected sequence of text into data packets, an apparatus for distributing the data packets, each data packet comprising the at least one predetermined portion of the preselected sequence of text and a display que from the main control unit and at least one display for receiving the data packets comprising a buffer for storing data from each of the data packets, an apparatus for selecting the at least one channel, a display que identifier, an apparatus for a visual presentation of the at least one predetermined portion of the selected at least one channel upon receipt of a signal from the display que identifier.

The preselected sequence of text can also comprise of graphics. The preselected sequence of text can also comprise a score. The at least one channel comprises a language.

The data packets preferably comprise a packet header, a header for the at least one channel, an end of message instruction for the at least one channel and an end of transmission instruction. The receipt by the at least one display of a next data packet overrides the stored data in the buffer. The data packets can also comprise at least one reserved character to control display brightness, image brightness and image display time. The main control unit comprises an apparatus for selecting the at least one predetermined portion of the preselected sequence of text.

The apparatus for distributing comprises a primary distribution line and at least one secondary branch. The structure for distributing preferably comprises an apparatus for electrically isolating a signal between the primary distribution line and the at least one secondary branch. The preferred at least one display comprises an individual user display.

The preferred method of simultaneously displaying at a remote site at least one channel of a preselected stored sequence of multichannel text comprises the steps of storing the preselected sequence of multichannel text in a main control unit, converting at least one predetermined portion of the preselected sequence of multichannel text into data packets, placing a display que into each of the data packets, transmitting the data packets to at least one display apparatus, storing the converted at least one predetermined portion of the preselected sequence of multichannel text, transmitting a display que from the main control unit to the at least one display apparatus, selecting the at least one channel and displaying the at least one predetermined portion of the preselected sequence of text of the selected at least one channel.

The step of storing the preselected sequence of multichannel text can further comprise storing graphics. The preferred step of storing a preselected sequence of multichannel text comprises storing text in different languages. The preferred step of converting comprises inserting a packet header, a header for the at least one channel, and end of message instruction for the at least one channel and an end of transmission instruction. The alternative step of storing the converted at least one predetermined portion of the preselected sequence on multichannel text comprises overriding the stored converted text with a next data packet. The alternative step of transmitting further comprises selecting the at least one predetermined portion of the preselected sequence of multichannel text. The steps of transmitting the data packets and a display que preferably comprise distributing the data packets and display que to the remote sites. The preferred step of distributing comprises electrically isolating a signal. The preferred step of displaying comprises individual user displays.

The primary object of the present invention is to provide performance patrons with an individual or group display unit which presents a channel of information they select to view.

It is another object of the present invention to restrict the displays visual output so that it is clearly visible only to that specific individual user or group.

Yet another object of the present invention is to provide users with the possibility of seeing the musical score as it is played or other graphic-based information.

The primary advantage of the present invention is that individual users can utilize the system without interfering with the enjoyment of others who do not wish to use the system or to be aware of its use by others.

Another advantage of the present invention is that it is possible to allow individual users a choice in the information they wish to see in conjunction with the performance.

Another advantage of the present invention is that each individual member of an audience can choose one of many channels of information of the current performance.

Yet another advantage of the present invention, when applied to cinema, is that one master copy of the film, with all translations desired encoded upon it, can be duplicated and sent to any venue where, with the appropriate equipment, any of the included translations can be accessed by individual patrons.

Another advantage is that people with disabilities or physical restrictions have access to visual information.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

This invention relates to a method for displaying simultaneously, at a number of individual locations, a user selected translation of a performance. The information is transmitted to the display units and upon command each display unit displays the selected channel of information simultaneously with other display units.

The electronic libretto apparatus and method of the present invention comprise hardware components and associated software to provide a user with the ability to view a selected score or text of an opera, for example, on an individual or group display unit in a language selected by the user. The invention is particularly useful in live theater, live opera, cinema, television and other like performances and media.

Figure 1:
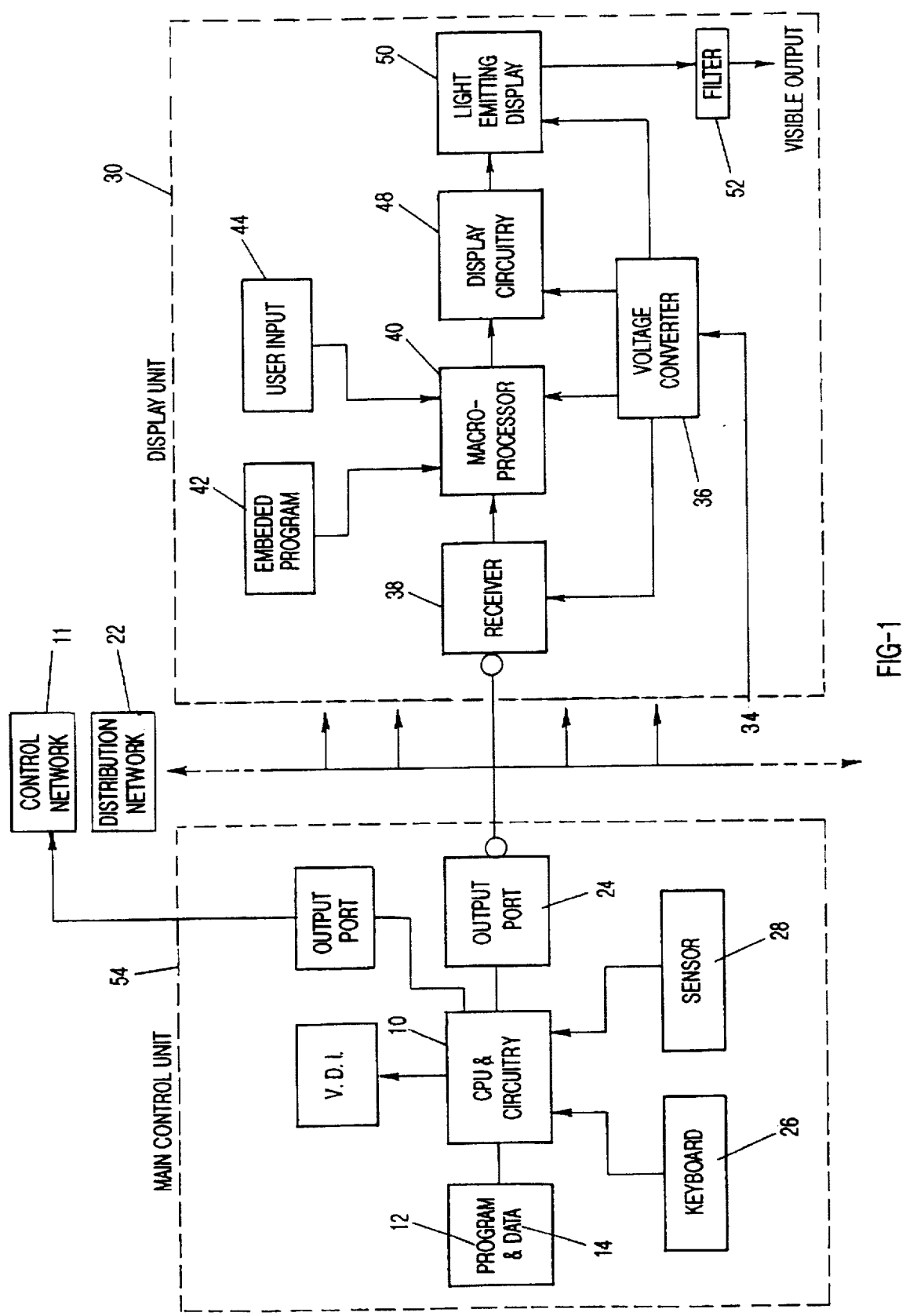
FIG. 1 is a block diagram of the preferred embodiment of the present invention.
Figure 6:
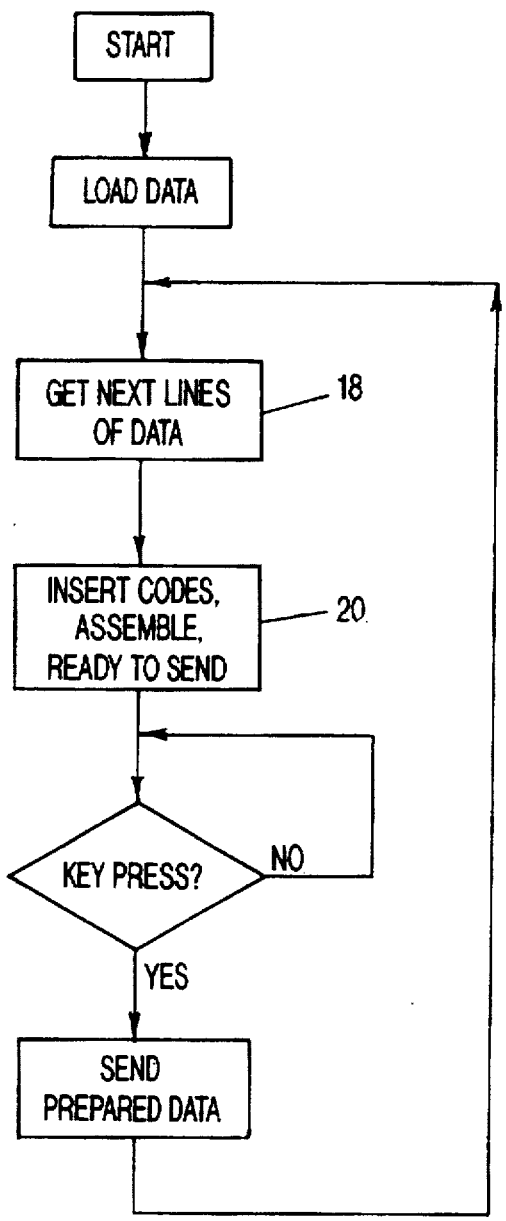
FIG. 6 is a flowchart of the main control unit program.

The preferred apparatus and method is shown in FIG. 1. There are three major sections to this preferred embodiment: main control unit 54, distribution network 22 and display unit 30. Computer 10 is loaded with custom program 12 containing text 14 of the particular production to be displayed simultaneously with the live show or cinema. In addition to the text 14 of a production, other visual information can be loaded such as scores, advertising and messages. Program 12, which is shown in FIG. 6, collects the next line 18 of each channel to be displayed by inserting "control code" 20 between individual sections. Program 16 then instructs computer 10 to prepare to transmit all of the next lines 18 sequentially into distribution system 22 via output port 24 and does so when the "supertitlist" (system operator) presses a selected key on computer keyboard 26. In an alternative embodiment, such as for use in the cinema, the "go signal" would come from a special mark on the film stock which is detected by sensor 28 mounted on the projector. Sensors of this type are well known in the art.

Distribution system 22 then transmits the lines of text 14 to display unit 30. This can be done via network system 22 which comprises isolated distribution amplifiers and wires to each seat in the auditorium through electrical conduit or the like. A second electrical flex 34 can also contain wires which carry power supply voltage for each individual display unit 30. In an alternative embodiment, battery powers the display units.

Figure 3:
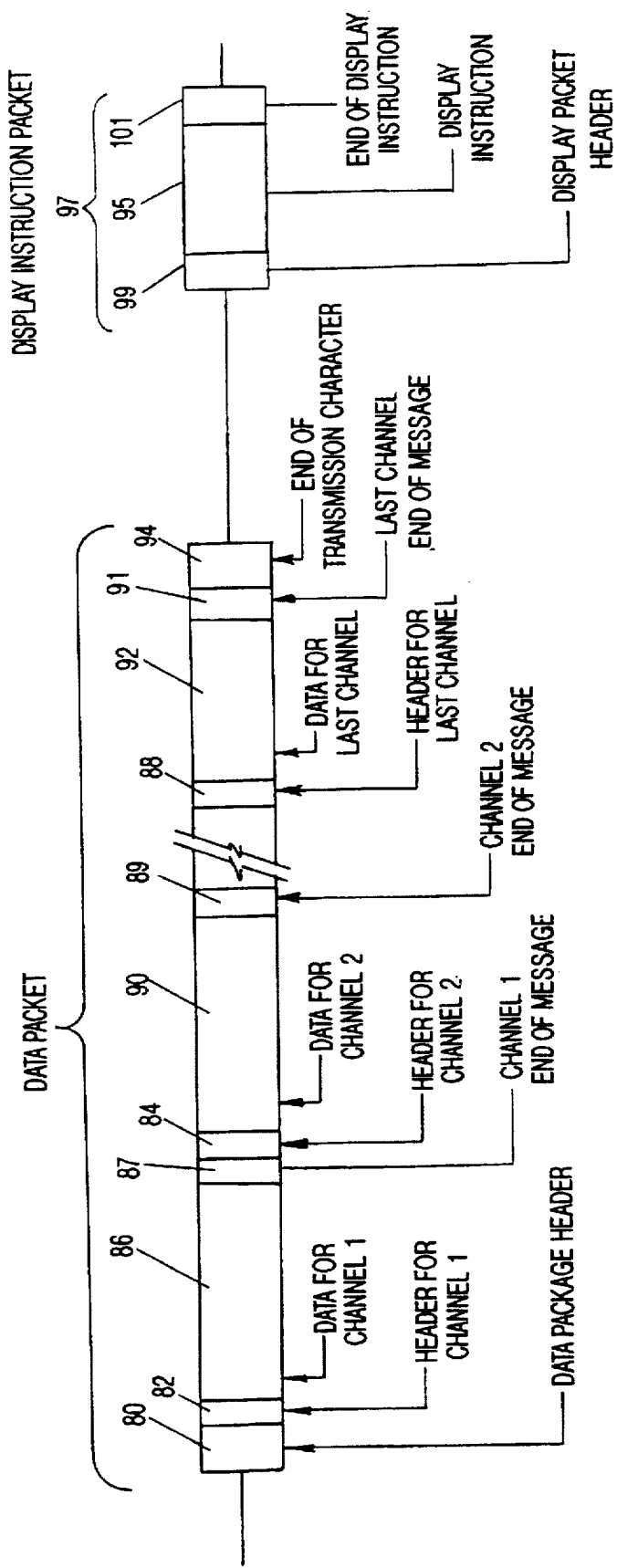
FIG. 3 is a schematic of a typical data packet.

Each of the channels are loaded via the distribution system 22 into memory buffer, contained within microprocessor 40 located in each display unit 30. Once a display instruction is sent via data packet, as shown in FIG. 3, the information is displayed simultaneously to all light emitting displays 50. The information displayed will depend on which channel the user selects. While the present data string is being displayed, the next data string is loaded into the memory buffer awaiting the next display instruction. In this manner, the data in each channel is displayed simultaneously. The number of channels available is dependent on the buffer size incorporated into the display unit 30.

The number of available channels is determined by transmitting a special control character followed by a number during initialization. For example, the first, third, fifth, etc., channels can be used as banner screens to announce what is being transmitted on the follow with channel by including with the message a special control character to switch to the next channel after a given time period has elapsed. The following second, forth, sixth, etc., channels can thus be utilized as active data channels.

Figure 4:
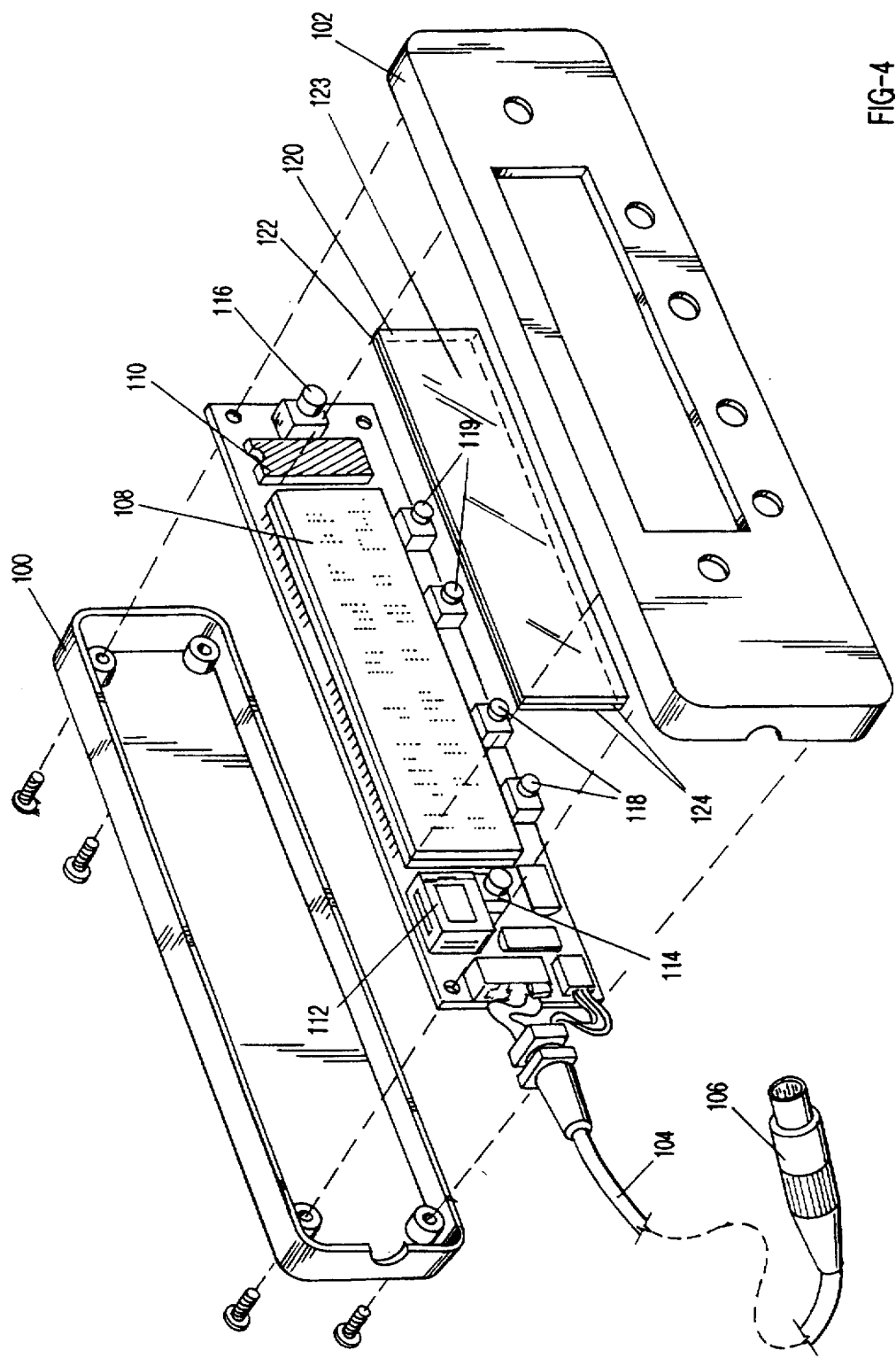
FIG. 4 is an exploded view of the preferred display apparatus.

To change a channel, the user presses a button 114, or the like, as depicted in FIG. 4.

Figure 7:
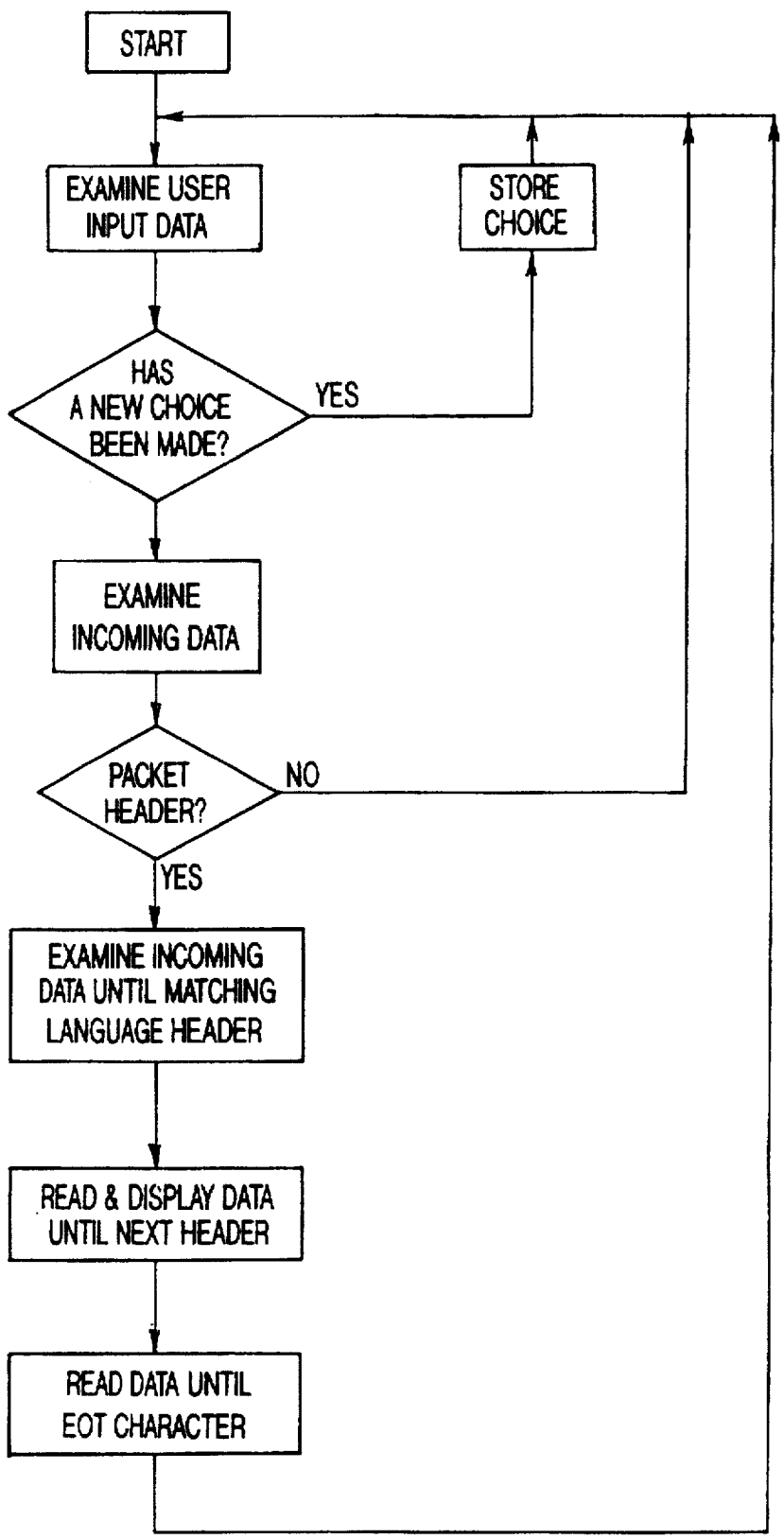
FIG. 7 is a flowchart of the display unit embedded program.

The power supply voltage is regulated by voltage converter 36 into different voltages for use within the display circuitry. Voltage converter 36 supplies power to receiver 38 which converts the transmitted signal over network system 22 to a form compatible with the display circuitry. Voltage converter 36 also supplies power to microprocessor 40 which, upon being energized, runs embedded program 42. A flow diagram for embedded program 42 is depicted in FIG. 7. Embedded program 42 instructs microprocessor 40 to examine user input 44 and signal input from distribution system 22 to receiver 38 and passes information to be displayed to display circuitry 48 which in turn causes the selected information to be presented by light emitting display 50. The visible output is modified by filter 52 and can then be seen by the user.

Figure 2:
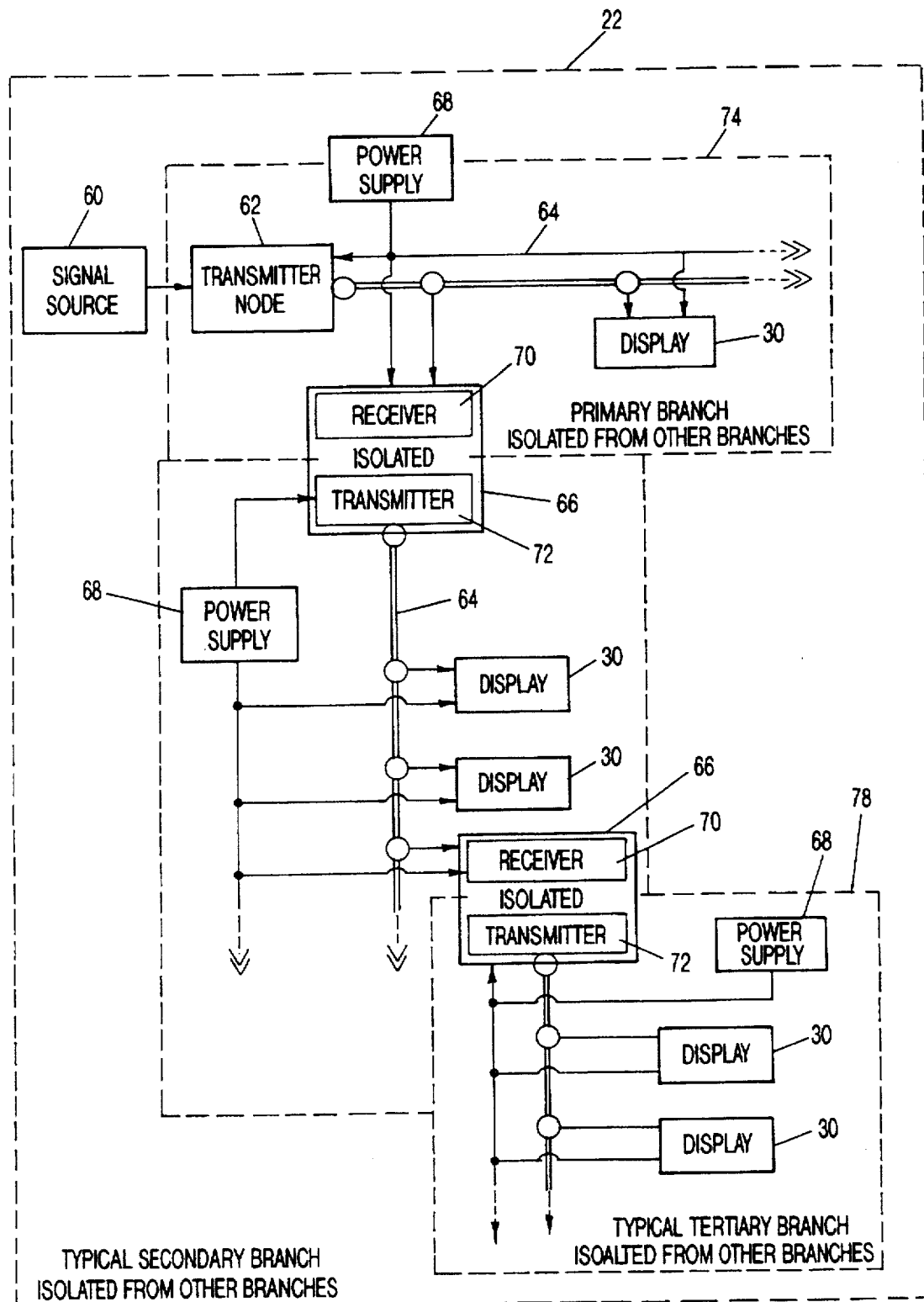
FIG. 2 is a schematic diagram of the distribution apparatus and method.

FIG. 2 is an electrical schematic of the isolated distribution system 22. Source signal 60 is sent to transmitter node 62 where it is converted and broadcast over network 64. The broadcast signal is received by displays 30 and repeater nodes 66. Power supply 68 supplies power to these units connected directly to immediate network branch 64 only. Receiver 70 is isolated from transmitter 72 with an optical isolator such as a Hewlett Packard Model No. 2011 optical isolator, or the like, which are well known in the art, and therefore no electricity can flow between different branches of the network 74, 76, and 78, thus protecting the distribution network 22 from electrical surges and spikes.

FIG. 3 shows a typical data packet which is broadcast over the distribution network. The information is transmitted to the displays in a packet of characters. The packet beginning is identified by a special reserved character identified as data packet header 80. The next character, another special reserved character, identifies channel 1 header 82. The character that follows is channel 1 data 86. Channel 1 data 86 can include other special reserved characters which can specify such things as maximum display brightness, how quickly the display images illuminate to a predetermined brightness level, how long the data is to be displayed and how quickly the visual output fades out to black. Channel 1 data 86 is terminated by another special reserved character, channel 1 end of message 87. The other channels operate similarly with channel 2 header 84 and ending with last channel header 88, followed by the respective channel data 90 and 92 and terminated by the respective end of message 89 and 91. The number of header channels, data channels and end of message channels is dependent on the number of channels to be transmitted.

Messages can be written to any or all available channels, those channels receiving a new message simply overwrite the existing message in the buffer. Existing messages not modified or overwritten are retained in their original form. Additional messages to other channels may be included, if desired. The data packet is terminated by another special reserved character, end of packet transmission 94.

Once the data has been transmitted to the display units another special reserved character, display instruction 95 is transmitted to the display units to display the text or image stored in each display unit memory buffer which corresponds to the channel selected by the user. Display instruction packet 97 comprises a display instruction packet header 99, display instruction 95 and end of display instruction 101.

In this embodiment, the main control computer 10 of FIG. 1, has the ability to go to any part of the text stored in memory at any time if so instructed. The stored text is instantaneously available at any time.

The control program 12 of FIG. 1, can also comprise a graphic representation of the opera score with the section of text imbedded as symbols and positioned on the score. The operator can, via the keyboard or other input device, cause the score to advance in step with the performance. When an embedded symbol is encountered, that section of text is automatically transmitted to the display units. This has the advantage of the operator only having to follow the music, the transmission of data is handled by the computer.

The computer, using well-known hardware in the art "listens" to the performance and follows the score, thus completely automatically causing the text to be transmitted to the display units at the appropriate moment. This will eliminate the need of an operator.

The distribution network 22 of FIG. 1, can also have built into it a means for examining their current status and activity and a means for turning the various sections on and off. This distribution network is then connected to a control network 11 which can monitor the condition of each distribution network card, report its status and, in the event of a problem, the control program 12 can, using this information determine the nature of the problem and specify the course of action to rectify the problem. The control program 12 utilizes the control network 11 to turn on and off remote sections of the system by issuing commands from the main control computer 10.

Figure 8:
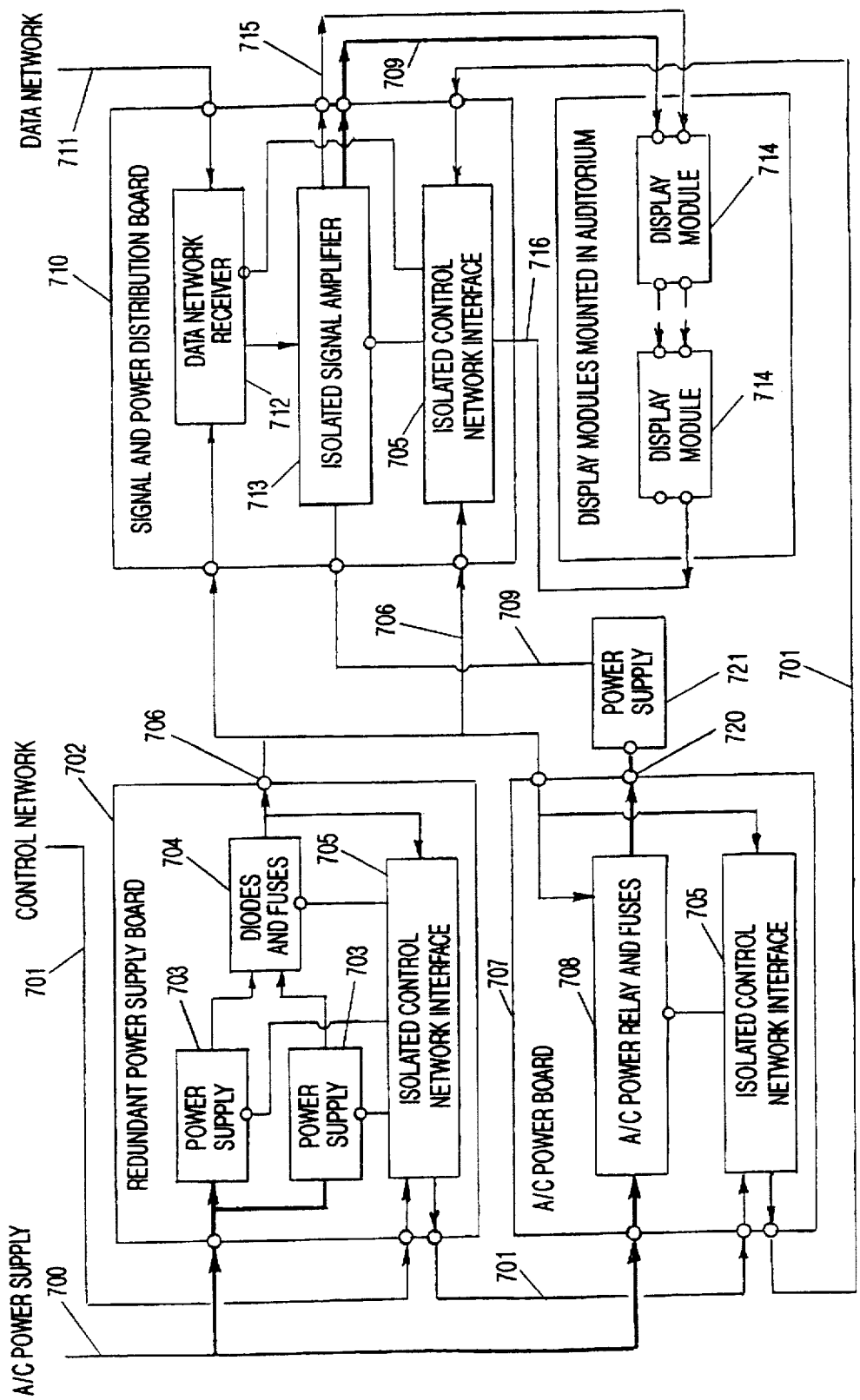
FIG. 8 is a block diagram of the control network and distribution card.

The control network 11 of FIG. 1 is shown in FIG. 8. A/C power 700 supplies voltage to power supplies (2) 703 on redundant power supply board 702. The DC voltage outputs are passed through a diode network and fuses 704 to prevent voltage from back-feeding the power supplies 703 should one fail. The DC outputs of power supplies 703 and diode network 704 are monitored by isolated control network interface 705 which will when instructed via control network 701 reports the status of the redundant power supply board. Redundant power supply board 702 provides a single failure tolerant DC power supply 706 for the distribution cards 702, 707 and 710.

A/C power board 707 is also connected to A/C power 700 which is fused and passed to relay 708. Relay 708 is controlled by isolated control network 702 interface 705, allowing voltage to pass to A/C power board output when instructed by control network 701. Isolated control network interface 705 also monitors the condition of the fuses and A/C power board output 707.

Switched A/C power is then fed to power supply 721 which produces DC voltage to power a branch of display modules 714.

Signal and power distribution board 710 receives DC power 706 to energize data network receiver circuitry 712. Data network 711 supplies signal to data network receiver 712 which passes data via optical isolators to isolated signal amplifiers 713. DC power 709 and isolated data signal 715 are then sent to display modules. The data signal from the last display module 716 is returned to the isolated control network interface 705 where it is compared with signal from data network 711 and isolated signal amplifier 713 and their status reported then instructed by control network 701.

This circuitry is constructed using available techniques and components well known to anyone familiar with the art.

In another embodiment, a system of fiber-optic cables are used to distribute the signal through distribution amplifiers and wires to each seat in the auditorium.

Another embodiment is to use a wireless distribution method utilizing electro-magnetic radiation.

In the preferred apparatus as shown in FIG. 4, the theater patron plugs display unit 30 into a receptacle mounted on or about the seat (not shown), permitting the unit to draw power to activate itself and receive data via the distribution system. The preferred display unit 30 comprises a back part of case 100, front part of case 102, cord 104 with a multi-pin plug 106, an apparatus to reduce and convert the voltage of the data transmission to a level compatible with the integrated circuitry (not shown), an alpha-numeric display 108 which is capable of displaying selected characters such as the ASCII range of characters, international characters, Cyrillic characters, Hebrew characters, katakana characters and several custom characters which can be defined and used as needed, microprocessor 110, voltage regulator 112, and switch 114 for selecting the channel to be displayed. Other switches 119 can be included to manually control brightness, to include or remove the musical or opera score, or other similar function.

The preferred alpha numeric display 108 is a Vacuum Florescent Display module (VFD), manufactured by industrial Electron Engineers, Inc., or the like, which contains circuitry to display characters when instructed. A colored transparent plastic sheet 120 with a hardened scratch resistant and glare inhibiting surface, manufactured by Panelview Inc., or the like, can be placed over the display to increase character contrast, modify the character color and protect the glass VFD 108 from damage. Transparent directional filters 122, manufactured by 3M Inc., or the like, which limit the angle at which the display can be seen, can also be included. The filter components can be bound together into a filter unit using die-cut double faced pressure sensitive self adhesive tape 124. Voltage regulator 112 which supplies +5 volts DC is connected to the VFD 108 and also to the microprocessor 110.

Figure 5:
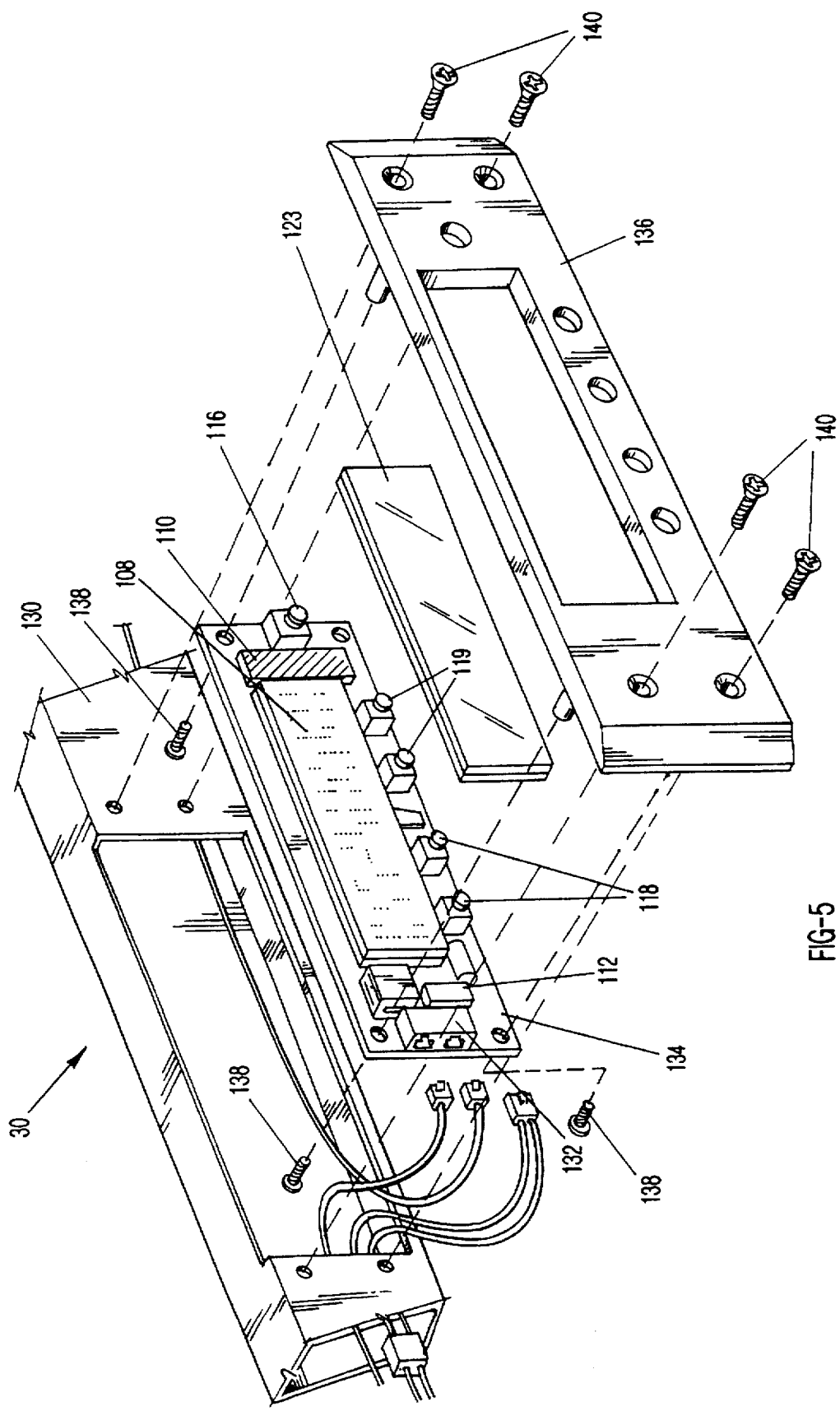
FIG. 5 is an exploded view of an alternative display apparatus.

In an alternate embodiment as shown in FIG. 5, the display unit 30 is permanently mounted in a tubular rail 130 which is rigidly attached to the floor or other part of the theater (not shown). The theater patron turns on the display by using the on/off switch 116 and selects the desired-channel by pressing the appropriate channel display switch 118. Other switches 119 can be available for other manual selections such as brightness control or to include a score or advertisement, if desired. The alpha numeric display 108, display circuitry (not shown), microprocessor 110, voltage regulator 112, signal converter (not shown), and connectors 132 can be combined onto one circuit board 134 which is attached to bezel 136 by mounting screws 138, or other appropriate mounting means. The filter unit 123 is sandwiched between bezel 136 and display 108. The combined display, filter and bezel assembly is then attached to the rail by screws 140.

In an alternate embodiment, display unit 30 may be a head mounted display unit, such as manufactured by Reflection Technology Inc., or the like, which projects an image of the text to be displayed into the user's field of vision. The projected image appears superimposed on whatever the user is viewing. Such a system would plug into a multi-pinned receptacle mounted upon the seat in a manner similar to the preferred embodiment.

In another alternate embodiment, display unit 30 may be mounted on the seat in front of the user and projects an image onto a transparent sheet which is positioned in the user's field of vision in a manner so as to reflect the projected image towards the user's eyes. The display 30 may also be built into seat backs. The projected image will then be visible to the theater patron.

In yet another alternate embodiment, a display unit 30 may be attached to a television receiver to display translations simultaneously transmitted with the video signal or obtained from a video tape recorder in a similar manner to the way secondary audio programing is currently handled. The information can be converted into a form compatible with the preferred embodiment, and the viewer would then be able to access translations of the program in the language of their choice. The display could be either a separate module or integrated into the television receiver.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for storing, transmitting and simultaneously displaying a preselected sequence of text in a selected language at least one remote site, the apparatus comprising:

main control unit means for storing said preselected sequence of text, wherein said preselected sequence of text comprises at least one language and an apparatus for converting at least one predetermined portion of said preselected sequence of text into one or more data packets;

means for simultaneously distributing each data packet of said one or more data packets, said each data packet comprising said at least one predetermined portion of said preselected sequence of text and a display que from said main control unit means; and at least one remote display for receiving said one or more data packets comprising:
a buffer for storing data from each of said one or more data packets;
an apparatus for selecting said at least one language;
a display que identifier; and
an apparatus for a simultaneous visual presentation of said at least one predetermined portion of said selected at least one language upon receipt of a signal from said display que identifier.

2. The invention of claim 1 wherein said preselected sequence of text comprises graphics.

3. The invention of claim 2 wherein said preselected sequence of text comprises a score.

4. The invention of claim 1 wherein said data packets further comprise a packet header, a header for said at least one language, an end of message instruction for said at least one language and an end of transmission instruction.

5. The invention of claim 1 wherein a receipt by said at least one display of a next data packet overrides said stored data in said buffer.

6. The invention of claim 1 wherein said data packets further comprise at least one reserved character to control display brightness, image brightness and image display time.

7. The invention of claim 1 wherein said main control unit means comprises an apparatus for selecting said at least one predetermined portion of said preselected sequence of text.

8. The invention of claim 1 wherein said means for distributing comprises a primary distribution line and at least one secondary branch.

9. The invention of claim 8 further comprising an apparatus for electrically isolating a signal between said primary distribution line and said at least one secondary branch.

10. The invention of claim 1 wherein said at least one display comprises an individual user display.

11. A method of simultaneously displaying at least one remote site at least one language of a preselected stored sequence of text, the method comprising the steps of:

a) storing the preselected sequence of text in a main control unit;

b) converting at least one predetermined portion of the preselected sequence of text into data packets;

c) transmitting the data packets to at least one display apparatus;

d) storing the converted at least one predetermined portion of the preselected sequence of text;

e) simultaneously transmitting a display que from the main control unit to the at least one display apparatus;

f) selecting the at least one language; and g) simultaneously displaying the at least one predetermined portion of the preselected sequence of text of the selected at least one language.

12. The method of claim 11 wherein the step of storing the preselected sequence of multichannel text further comprises storing graphics.

13. The method of claim 11 whereto the step of converting further comprises inserting a packet header, a header for the at least one language, and end of message instruction for the at least one language and an end of transmission instruction.

14. The method of claim 11 wherein the step of storing the converted at least one predetermined portion of the preselected sequence of text comprises overriding the stored converted text with a next data packet.

15. The method of claim 11 wherein the step of transmitting further comprises selecting the at least one predetermined portion of the preselected sequence of text.

16. The method of claim 11 wherein the steps of transmitting the data packets and a display que comprise distributing the data packets and display que to the at least one remote site.

17. The method of claim 16 wherein the step of distributing comprises electrically isolating a signal.

18. The method of claim 11 wherein the step of displaying comprises individual user displays.

* * * * *